United States Patent

[11] 3,593,085

| [72] | Inventor | Ernest J. Decker, Jr. |
| --- | --- | --- |
| | | Carpentersville, Ill. |
| [21] | Appl. No. | 886,066 |
| [22] | Filed | Dec. 18, 1969 |
| [45] | Patented | July 13, 1971 |
| [73] | Assignee | Jerry K. Kelley |
| | | Rosmont, Cook County, Ill. |

[54] SPEED AND POSITION CONTROL FOR ELECTRIC MOTOR
5 Claims, 2 Drawing Figs.

| [52] | U.S. Cl. | 318/302, |
| --- | --- | --- |
| | | 318/212, 318/382 |
| [51] | Int. Cl. | H02p 7/04 |
| [50] | Field of Search | 318/257, |
| | | 266, 212, 302, 382; 310/109 |

[56] References Cited
UNITED STATES PATENTS

| re.24,168 | 6/1956 | Pell | 318/302 |
| --- | --- | --- | --- |
| 3,201,674 | 8/1965 | Wada | 318/302 |

Primary Examiner—Oris L. Rader
Assistant Examiner—K. L. Crosson
Attorney—Kinzer, Dorn and Zickert ABSTRACT: A precision speed and position control for an electric motor having a DC brake winding, comprising a transistor amplifier for energizing the brake winding and having a control potentiometer for varying the amplifier output, and an on-off switch for opening and closing the drive circuit of the motor; the on-off switch is mechanically interlocked with the potentiometer to afford maximum brake excitation whenever the switch is off.

Inventor
Ernest J. Decker, Jr.
By Kinzer, Dorn and Zickert
Attorneys

SPEED AND POSITION CONTROL FOR ELECTRIC MOTOR

CROSS REFERENCE TO RELATED APPLICATION

This invention constitutes an improvement upon the control circuits disclosed in the copending application of Jerry J. Kelley and Ernest J. Decker, Ser. No. 630,350, filed Apr. 12, 1967 now U.S. Pat. No. 3,521,136 issued July 21, 1970.

BACKGROUND OF THE INVENTION

There are a number of different applications in which an electric motor drive must be controlled precisely and accurately both with respect to speed and terminal position of the driven apparatus. This is particularly true with respect to equipment that must be driven in opposed directions or in two or more coordinate directions, including machine tools, games, optical instruments, therapy apparatus and training equipment. In many of these devices, it is essential to provide a control that drives one or more electric motors at precise speed up to a stopping point and to achieve immediate stopping and firm positioning of the driven apparatus once the stopping point is reached.

One basic control circuit that is described in the aforementioned copending application of Kelley and Decker utilizes an electric alternating current motor equipped with a direct current brake. The motor drive windings are energized fully whenever the motor is in operation. Speed control is exercised by controlling the amplitude of excitation to the brake winding of the motor. Thus, for high speed operation the brake excitation is reduced to virtually zero level, whereas for slow speed operation a brake current of substantial amplitude is supplied to the motor. On stopping, the drive windings of the motor are completely deenergized and the brake winding is energized at its maximum level.

This particular type of control is quite effective in many applications but presents some difficulties with respect to cost, size, and expense of the control components for the brake winding, particularly the speed control potentiometer. Relatively high currents are required for the braking operation, particularly where "creeping" speeds must be sustained over substantial intervals of time. The high-amperage potentiometers required for these controls are large in size, difficult to produce, and quite expensive, particularly in comparison with the remainder of the apparatus. Moreover, precise speed control, with such high-current potentiometers, is impractical.

SUMMARY OF THE INVENTION

It is a primary object of the present invention, therefore, to provide a precision speed and position control for an electric motor, in which speed variations are determined by changing the level of excitation to a brake winding incorporated in the motor, but wound on a separate lamination stack, and in which speed control is effected by means of a small, simple and economical amplifier circuit.

A specific object of the invention is to provide a new and improved high precision speed and position control for an electric motor, with speed variations determined by the excitation level of a DC brake winding incorporated in the motor, that does not require the use of a potentiometer or similar adjustable impedance carrying the full braking current.

Another object of the invention is to provide a new and improved high precision speed and position control for an electric motor that is readily applicable to a unidirectional drive or to a reversible drive, yet utilizes only a simple and economical operating circuit.

Accordingly, the present invention relates to a precision speed and position control for an alternating current electric motor of the kind including a rotor, a drive winding field-coupled to the rotor, and a brake winding field-coupled to a separate part of the rotor. The control of the invention comprises a drive circuit for electrically coupling the drive winding of the motor to an AC power supply, the drive circuit including on-off switch means. A brake circuit electrically couples the braking winding of the motor to the power supply; the brake circuit comprises a rectifier in series with a solid-state DC amplifier including a control potentiometer continuously adjustable between a home position in which the amplifier supplies minimal braking current to the brake winding, thereby affording a continuously variable precision speed control for the motor. The control potentiometer is mechanically interconnected with the on-off switch means to actuate the switch to its off condition whenever the potentiometer is adjusted to its home position, maintaining the motor at any given orientation whenever the drive winding is deenergized.

DESCRIPTION OF THE PREFERRED EMBODIMENTS

Figure 1:
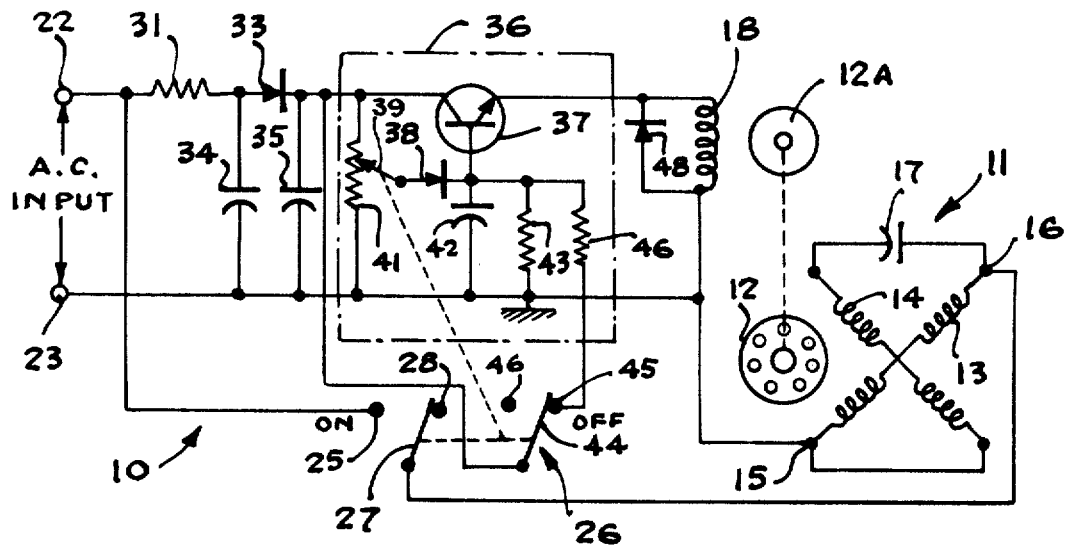
FIG. 1 is a schematic diagram of a precision speed and position control for a unidirectional electric motor constructed in accordance with the present invention.

FIG. 1 illustrates a precision speed and position control circuit 10 for a unidirectional AC electric motor 11. Motor 11 comprises a rotor 12 that is field-coupled to the drive windings of the motor. There are two drive windings 13 and 14 for the permanent split capacitor motor shown in FIG. 1. One end of each of the windings 13 and 14 is connected to a first input terminal 15 for the motor. The opposite end of winding 13 is connected to a second input terminal 16. The end of winding 14 opposite terminal 15 is coupled to input terminal 16 by a capacitor 17. Motor 11 further includes a DC energized brake winding 18 that is field-coupled to a separate part 12A of the rotor 12 of the motor. Usually, the drive portion 12 of the rotor and the brake portion 12A of the rotor are separated by an air gap of one-half inch or more.

Control 10 comprises a drive circuit for electrically coupling an AC power supply to the drive windings 13 and 14 of motor 11. The drive circuit begins at the two input terminals 22 and 23, connected to a suitable AC power supply. Terminal 23 is directly connected to motor terminal 15 and may, as indicated in FIG. 1, constitute a system ground connection. Terminal 22 is connected to one fixed contact 25 of a double-pole, double-throw on-off switch 26. Contact 25 is positioned to be engaged by a movable contact 27 when switch 26 is thrown to its "on" position. Movable contact 27 engages an open contact 28 when the switch 26 is in its "off" condition, as illustrated. Movable contact 27 is electrically connected to the motor input terminal 16.

Control 10 further comprises a brake circuit for electrically coupling the brake winding 18 of motor 11 to the power supply. The brake circuit includes an initial rectifier stage comprising a resistor 31 connecting supply terminal 22 to the cathode of a diode 33. A capacitor 34 is connected from the cathode of diode 33 to the system ground terminal 23 and a filter capacitor 35 is connected from the anode of diode 33 to terminal 23.

The brake circuit of control 10 further comprises a solid-state DC amplifier 36. Amplifier 36 includes a transistor 37 having its collector connected to one terminal of the motor brake winding 18; the other terminal of winding 18 is returned to the system ground terminal 23. The base electrode for transistor 37 is connected through a blocking diode 38 to the movable tap 39 of a control potentiometer 41. One terminal of potentiometer 41 is connected to the anode of diode 33 and the other terminal is connected to the system ground terminal 23. The base electrode of transistor 37 is also connected to terminal 23 by the parallel combination of a capacitor 42 and a resistor 43.

The brake circuit of control 10 also includes a second pole of the on-off switch 26, comprising a movable contact 44 that engages a fixed contact 45 when the switch is in its "off" condition and that engages a fixed contact 46 when the switch is "on." The movable contact 44 is connected to the anode of diode 33. The fixed contact 46 is open circuited, but the fixed contact 45 is connected to the base electrode of transistor 37 through a small current-limiting resistor 46.

In considering operation of the speed and position control 10, it may first be assumed that the on-off switch 26 is in its off position, as illustrated. Under these conditions, the drive circuit for the drive windings 13 and 14 of motor 11 is open circuited at the switch contact 27. Thus, the drive windings are deenergized and the motor cannot rotate. The rotor of the motor is held in its present angular orientation because the power transistor 37 in DC amplifier 36 is biased to full conduction and supplies a relatively high brake current to the brake winding 18 of the motor. Preferably, a diode 48 is connected across brake winding 18 to preclude any tendency toward rotation of the motor that might arise if an AC excitation were supplied to the brake winding.

A mechanical interconnection is provided between the on-off switch 26 and the movable tap 39 of potentiometer 31. This mechanical interconnection may provide for a single operating lever as in the aforementioned copending application of Kelley and Decker, although other mechanical linkages can be utilized.

When switch 26 is thrown to its "on" condition, an operating circuit is completed to the drive windings 13 and 14 of motor 11, since the motor input terminal 16 is now connected to the AC supply terminal 22 through the switch contacts 25 and 27. At the same time, the connection from the anode of diode 33 to the base electrode of transistor 37 through resistor 46 is broken, the circuit being open at contacts 44 and 45 of switch 26. This initial transition makes little difference in the output of amplifier 36, however, since the tap 39 of potentiometer 41 is still located near the top of the potentiometer and a maximum control signal is still applied to the base of transistor 37, maintaining the transistor in full conductive condition. Thus, although both drive windings of motor 11 are fully energized, the motor can do more than creep very slowly or may even remain at rest, depending upon the inertia of the load that the motor is required to drive, since the brake afforded by winding 19 is still full on.

To increase the speed of motor 11, the tap 39 on control potentiometer 41 is advanced from the home position shown in FIG. 1 toward a release position in which the control signal supplied to the base of transistor 37 is materially reduced in amplitude. That is, tap 39 is moved downwardly of potentiometer 41, reducing the amplitude of the control signal applied to the base of the transistor in amplifier 36. The minimum braking condition, with transistor 37 completely or almost completely cut off, corresponds to the extreme limit of movement of potentiometer tap 39. It can thus be seen that adjustment of the potentiometer tap affords a continuously variable speed control for motor 11 by continuous adjustment of the braking of the motor through brake winding 18.

At any point of operation, the user of control 10 may desire to stop the rotation of motor 11 with little or no change of the angular orientation of the motor shaft. This is accomplished by throw switch 26 from its "on" condition back to its "off" condition. When this is done, the mechanical interconnection between switch 26 and potentiometer tap 39 immediately shifts the potentiometer tap back toward its home position, increasing the braking current to brake winding 18 by driving transistor 37 back to full conduction. As switch 26 reaches its "off" position, contacts 44 and 45 close, again completing a circuit to the base electrode of transistor 37 through small limiting resistor 46, preventing damage to the transistor as might occur if the base electrode were connected directly to the amplifier input, the anode of diode 33. That is, the adjustment of potentiometer 41 to its home position also operates to actuate switch 26 to its "off" condition, providing full energization of the motor brake to maintain the motor at any given orientation, while simultaneously deenergizing the drive windings of the motor.

The control 10 provides an accurate and precise speed control for motor 11 without requiring the use of a large and expensive potentiometer or similar control element capable of handling the full braking current for the motor. The energized circuit for the brake winding is quite simple and inexpensive and can be mounted, complete, on a small circuit board. The control circuit is readily adaptable to virtually any mechanical actuation arrangement that provides an interconnection between the on-off switch 26 and the potentiometer 41.

Figure 2:
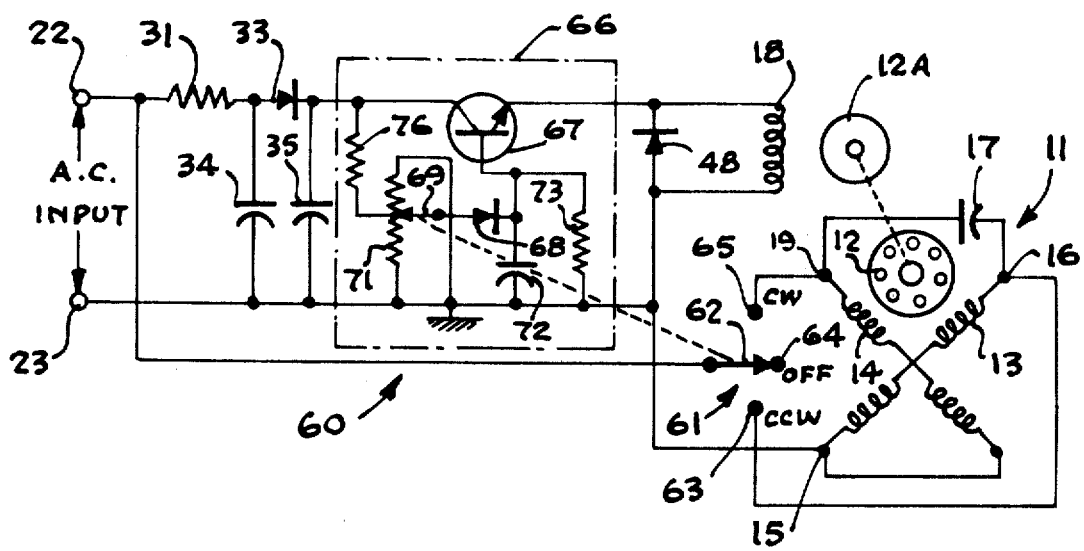
FIG. 2 is a schematic diagram illustrating another embodiment of the invention constituting a precision speed and position control for a reversible electric motor.

FIG. 2 illustrates a precision speed and position control 60 constructed in accordance with another embodiment of the invention and utilized for the control of a reversible electric motor. As before, the motor 11 is of the permanent split capacitor type including a rotor 12 that is field-coupled to two drive windings 13 and 14. One end of each of windings 13 and 14 is electrically connected to an input terminal 15 that is in turn connected to the AC supply terminal 23. The other ends of windings 13 and 14 are interconnected by a capacitor 17. As before, the motor 11 is provided with a DC brake winding 18 coupled to a separate rotor section 12A, preferably with a diode 48 connected across the brake winding.

The drive circuit for motor 11, in control 60, includes a single-pole triple-throw on-off switch 61 having a movable contact 62 engageable with three fixed contacts 63, 64 and 65. The movable contact 62 of switch 61 is connected to the AC supply terminal 22. The center fixed contact 64 of switch 61 is the "off" contact of the switch and is left open-circuited. The fixed contact 63 of switch 61 is an "on" contact which is connected to the motor input terminal 16 that is directly connected to drive winding 13 and is also coupled to winding 14 through capacitor 17. The fixed contact 65 is a second "on" contact connected to a second motor input terminal 19 that is directly connected to drive winding 14 and is also coupled to drive winding 13 by capacitor 17.

The brake circuit of control 60 includes an initial rectifier stagelike that of control 10, comprising a series resistor 31, a diode 33, and two shunt capacitors 34 and 35. The brake circuit further comprises a solid-state DC amplifier 66 that is basically similar to the amplifier described in conjunction with FIG. 1, but with some variations.

Amplifier 66 includes a transistor 67 having its collector connected to the anode of diode 33 and its emitter connected to brake winding 18. As before, the base of the transistor is connected to the ground terminal 23 by a parallel RC circuit comprising a resistor 73 and a capacitor 72. The base electrode of the transistor is also connected through a blocking diode 68 to the movable tap 69 of a control potentiometer 71. In this circuit both of the end terminals of the potentiometer are connected to the reference supply terminal 23. A center tap is provided on the potentiometer and is connected to the anode of the rectifier diode 33 by a small current-limiting resistor 76.

The precision speed and position control 60 of FIG. 2 operates in essentially the same manner as the control 10 of FIG. 1, but provides control for rotation of motor 11 in either a clockwise or a counterclockwise direction. Thus, as long as the on-off switch 61 remains in the "off" position, as shown in FIG. 2, the drive windings of motor 11 are deenergized. Moreover, the variable tap 69 of potentiometer 71 remains at its home position at the center of the potentiometer, so that the only limiting impedance in the control circuit for transistor 67 is the small resistor 76. The transistor 67 is maintained in full conductive condition and supplies a maximum braking current to the brake winding 18 of the motor.

When switch 61 is actuated to its "on" condition to drive motor 11 counterclockwise, closing contacts 62 and 63, the initial speed of the motor is quite low or may even remain at zero, depending upon the load that the motor is required to drive. But the on-off switch is mechanically interlocked with potentiometer tap 69, and continued actuation of the potentiometer tap downwardly of the potentiometer reduces the control signal input to transistor 67, gradually reducing the braking currents applied to winding 18. Thus, as in the previous embodiment, the control potentiometer can be continuously adjusted from its home position in which the amplifier 66 supplies maximum braking current to the brake winding and a first release position in which the amplifier supplies minimal or no braking current to the brake winding. In this manner, continuously variable speed control for counterclockwise rotation of the motor 11 is obtained.

Similarly, actuation of the on-off switch 61 to close contacts 62 and 65 energizes the drive windings of the motor for clockwise rotation. Continued movement of the linkage connecting switch 61 and potentiometer 71 enables the operator to drive the potentiometer tap 69 toward a second release position at the top of potentiometer 71, reducing the braking current to a minimum and providing continuously variable speed control for clockwise rotation of the motor 11. The mechanical interconnection between the control potentiometer 71 and the on-off switch 61 again actuates the on-off switch 61 to its "off" condition whenever the potentiometer tap 69 is returned to its center home position. This assures maximum braking to arrest and maintain the motor at any given orientation whenever the drive windings 13 and 14 are deenergized.

In order to afford a more complete and explicit example of the present invention, circuit data for each of the two embodiments illustrated in FIGS. 1 and 2 is set forth in detail hereinafter. It should be understood that these data are provided solely by way of illustration and in no sense as a limitation on the invention.

RESISTORS AND POTENTIOMETERS

| | |
|---|---|
| 31 | 100 ohms |
| 41 | 25 kilohms |
| 71 | 50 kilohms |
| 43,73 | 47 kilohms |
| 46,76 | 470 ohms |

CAPACITORS

| | |
|---|---|
| 34 | 0.05 microfarad |
| 35 | 30 microfarad |
| 42, 72 | 1 microfarad |
| 17 | 5 microfarad |

SEMICONDUCTOR DEVICES

| | |
|---|---|
| Diodes 33,38,48,68 | 1N3194 |
| Transistors 37,67 | 40374 RCA |

I claim:

1. A precision speed and position control for an alternating current electric motor, of the kind including a rotor, a drive winding field-coupled to the rotor, and a brake winding field-coupled to a separate part of the rotor, comprising:
    a drive circuit, electrically coupling said drive winding to an AC power supply, said drive circuit including on-off switch means;
    a brake circuit, electrically coupling said brake winding to said power supply, said brake circuit comprising a rectifier in series with a solid-state DC amplifier, said amplifier including a control potentiometer continuously adjustable between a home position in which said amplifier supplies maximum braking current to said brake winding and a release position in which said amplifier supplies minimal braking current to said brake winding, affording a continuously variable speed control for the motor;
    and means mechanically interconnecting said control potentiometer and said on-off switch means to adjust said potentiometer to its home position whenever said switch means is actuated to its "off" condition, maintaining the motor at any given orientation whenever the drive winding is deenergized.

2. A precision speed and position control for an electric motor, according to claim 1, in which said DC amplifier comprises a transistor having an input electrode, an output electrode, and a control electrode, said input and output electrodes being connected in series between said rectifier and said brake winding, and said control potentiometer being connected in a circuit connecting said rectifier to said control electrode.

3. A precision speed and position control for an electric motor, according to claim 2, in which said on-off switch means is a two-pole switch having a first pole connected in said drive circuit and having a second pole connected in series with a current-limiting impedance between said rectifier and said control electrode to supply a predetermined maximum control signal to said control electrode whenever said on-off switch means is in its "off" condition.

4. A precision speed and position control for an electric motor, according to claim 2, for use with a reversible motor, in which said on-off switch means has two different on operating conditions, one for each direction of motor rotation, and in which the said potentiometer has two release positions at the opposite ends of the potentiometer, the home position for the potentiometer being its center position.

5. A precision speed and position control for a reversible electric motor, according to claim 4, in which said potentiometer has a center tap connected to said rectifier through a small current-limiting resistor to supply a predetermined maximum control signal to said control electrode whenever said on-off switch means is in its "off" condition.